(12) United States Patent
Vasseur et al.

(10) Patent No.: US 11,171,975 B2
(45) Date of Patent: Nov. 9, 2021

(54) DYNAMIC INSPECTION OF NETWORKING DEPENDENCIES TO ENHANCE ANOMALY DETECTION MODELS IN A NETWORK ASSURANCE SERVICE

(71) Applicant: Cisco Technology, Inc., San Jose, CA (US)

(72) Inventors: Jean-Philippe Vasseur, Saint Martin d'uriage (FR); Grégory Mermoud, Veyras (CH); Santosh Ghanshyam Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 336 days.

(21) Appl. No.: 16/141,007

(22) Filed: Sep. 25, 2018

(65) Prior Publication Data
US 2020/0099709 A1 Mar. 26, 2020

(51) Int. Cl.
| | | |
|---|---|---|
| *G06F 21/00* | (2013.01) | |
| *H04L 29/06* | (2006.01) | |
| *H04L 12/24* | (2006.01) | |
| *H04L 12/707* | (2013.01) | |
| *H04W 88/12* | (2009.01) | |
| *H04L 12/747* | (2013.01) | |
| *G06N 20/00* | (2019.01) | |

(52) U.S. Cl.
CPC ......... *H04L 63/1425* (2013.01); *G06N 20/00* (2019.01); *H04L 41/065* (2013.01); *H04L 41/0893* (2013.01); *H04L 41/12* (2013.01); *H04L 45/22* (2013.01); *H04L 45/742* (2013.01); *H04W 88/12* (2013.01)

(58) Field of Classification Search
CPC ... H04L 41/16; H04L 63/1425; H04L 41/065; H04L 41/0893; H04L 41/12; G06N 20/00
See application file for complete search history.

(56) References Cited

U.S. PATENT DOCUMENTS 7,363,656 B2 * 4/2008 Weber ................. H04L 63/1425
                                                         709/223
9,037,896 B2    5/2015 Addepalli et al.
(Continued)

FOREIGN PATENT DOCUMENTS

WO    WO-2015004502 A1    1/2015

*Primary Examiner* — Trong H Nguyen
*Assistant Examiner* — Michael M Lee
(74) *Attorney, Agent, or Firm* — Behmke Innovation Group LLC; Kenneth J. Heywood; Jonathon P. Western

(57) ABSTRACT

In one embodiment, a network assurance service that monitors a network detects, using a machine learning-based anomaly detector, network anomalies associated with source nodes in the monitored network. The network assurance service identifies, for each of the detected anomalies, a set of network paths between the source nodes associated with the anomaly and one or more potential destinations of traffic for that source node. The network assurance service correlates networking devices along the network paths in the identified sets of network paths with the detected network anomalies. The network assurance service adjusts the machine learning-based anomaly detector to use a performance measurement for a particular one of the networking devices as an input feature, based on the correlation between the particular networking device and the detected network anomalies.

19 Claims, 9 Drawing Sheets

(56) References Cited

U.S. PATENT DOCUMENTS

| | | | |
|---|---|---|---|
| 9,930,057 B2 | 3/2018 | Di Pietro et al. | |
| 2007/0028220 A1 | 2/2007 | Miller et al. | |
| 2014/0283062 A1* | 9/2014 | Kamthe | H04W 12/1205 |
| | | | 726/23 |
| 2015/0020199 A1* | 1/2015 | Neil | H04L 63/1425 |
| | | | 726/23 |
| 2016/0217056 A1* | 7/2016 | Chua | G06F 11/3006 |
| 2016/0219066 A1* | 7/2016 | Vasseur | H04L 63/1425 |
| 2017/0093907 A1* | 3/2017 | Srivastava | H04L 63/1458 |
| 2017/0104774 A1 | 4/2017 | Vasseur et al. | |
| 2017/0149639 A1* | 5/2017 | Vasseur | H04L 12/44 |
| 2017/0302665 A1* | 10/2017 | Zou | H04L 67/306 |
| 2018/0270126 A1* | 9/2018 | Tapia | H04L 41/5067 |

\* cited by examiner

DYNAMIC INSPECTION OF NETWORKING DEPENDENCIES TO ENHANCE ANOMALY DETECTION MODELS IN A NETWORK ASSURANCE SERVICE

TECHNICAL FIELD

The present disclosure relates generally to computer networks, and, more particularly, to the dynamic inspection of networking dependencies to enhance anomaly detection models in a network assurance service.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
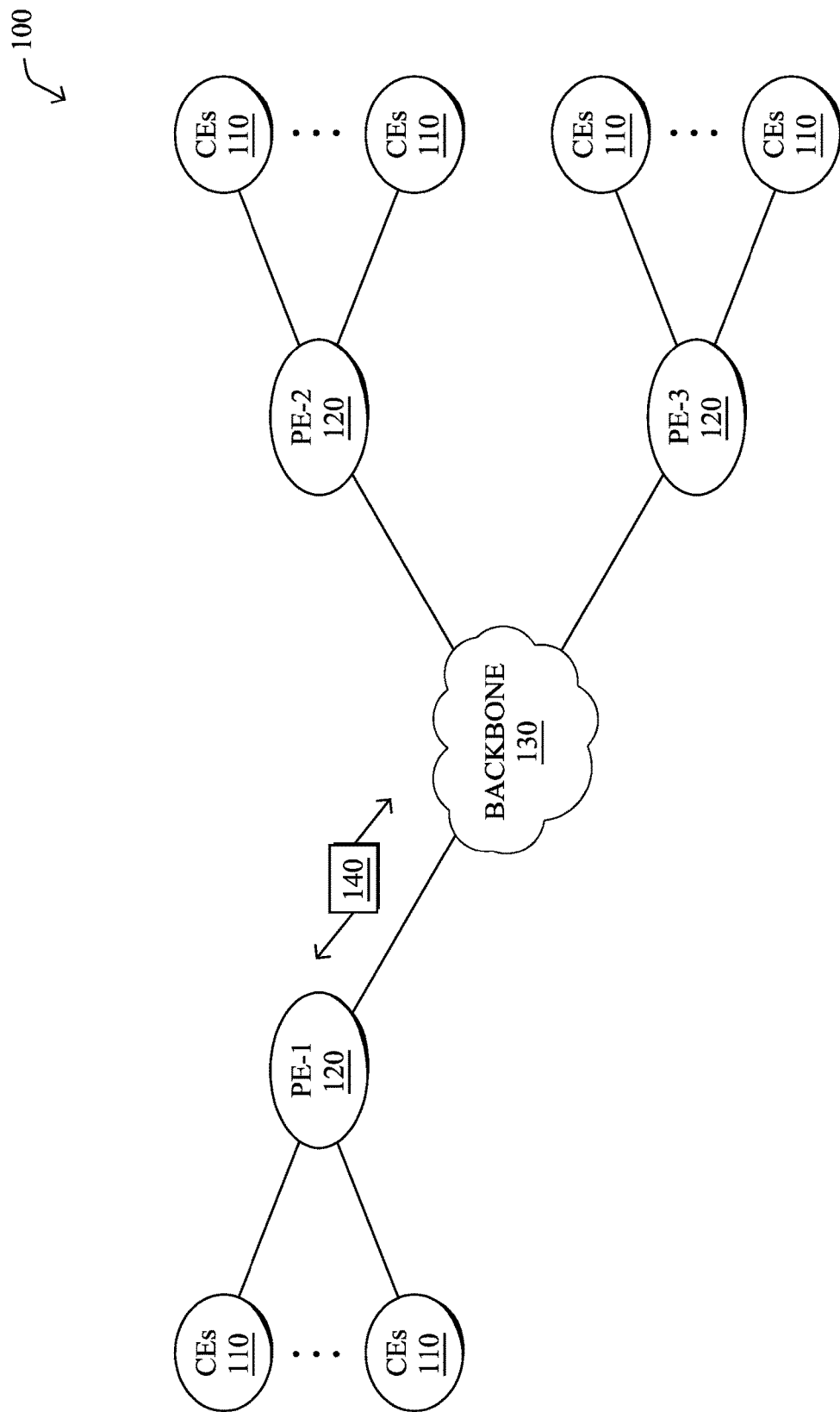
FIGS. 1A-1B illustrate an example communication network.

According to one or more embodiments of the disclosure, a network assurance service that monitors a network detects, using a machine learning-based anomaly detector, network anomalies associated with source nodes in the monitored network. The network assurance service identifies, for each of the detected anomalies, a set of network paths between the source nodes associated with the anomaly and one or more potential destinations of traffic for that source node. The network assurance service correlates networking devices along the network paths in the identified sets of network paths with the detected network anomalies. The network assurance service adjusts the machine learning-based anomaly detector to use a performance measurement for a particular one of the networking devices as an input feature, based on the correlation between the particular networking device and the detected network anomalies.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
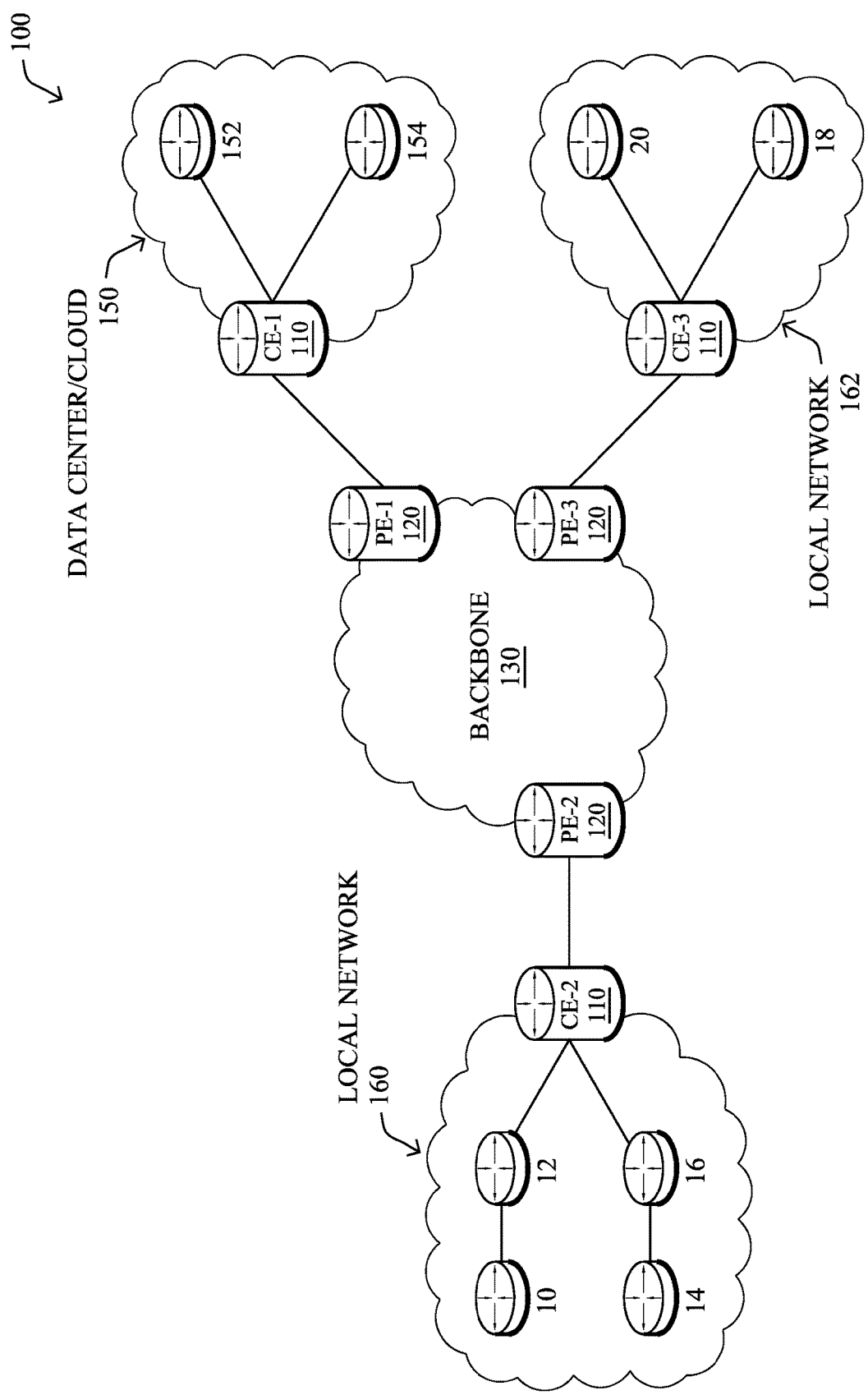

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an authentication, authorization and accounting (AAA) server, an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
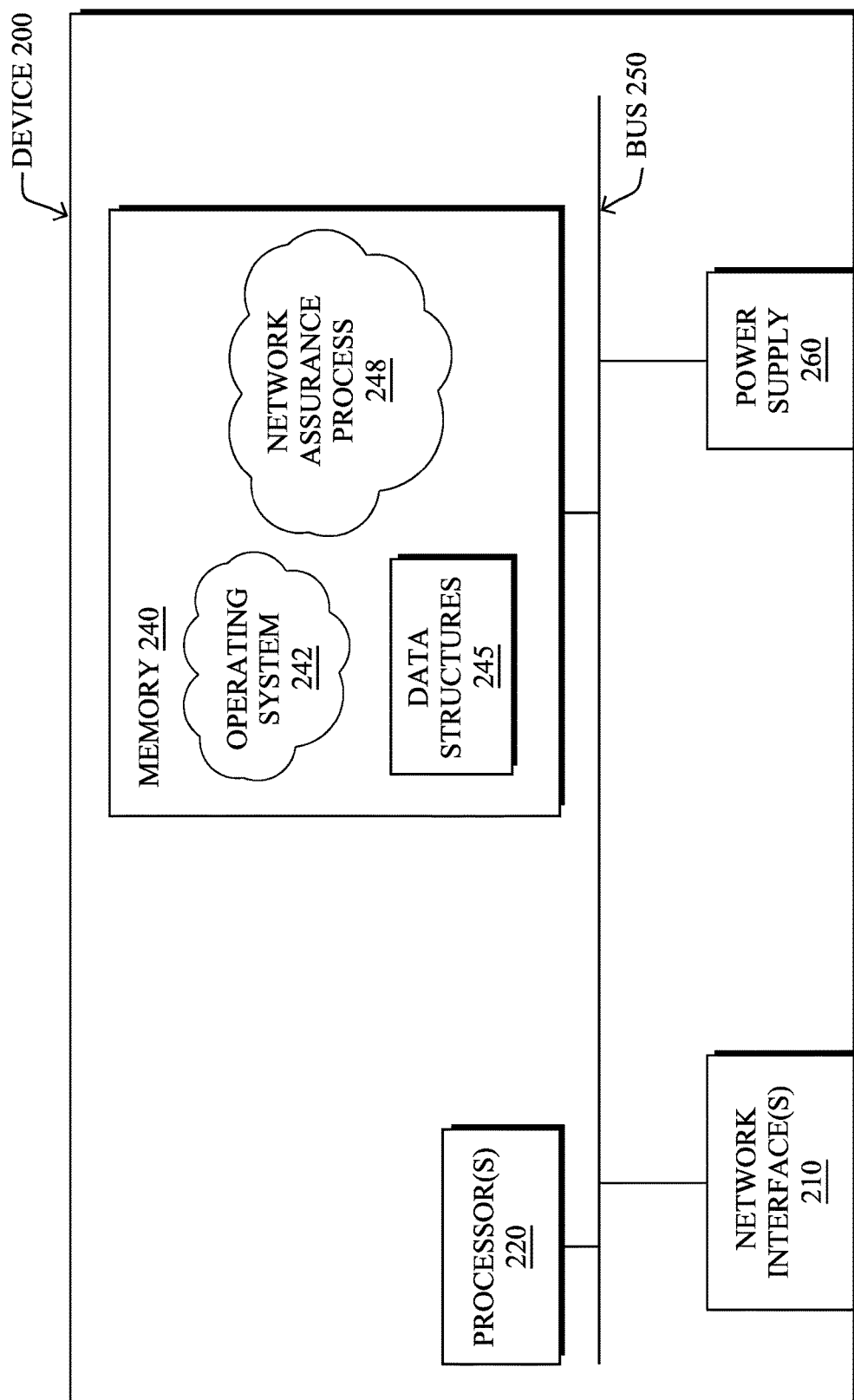
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
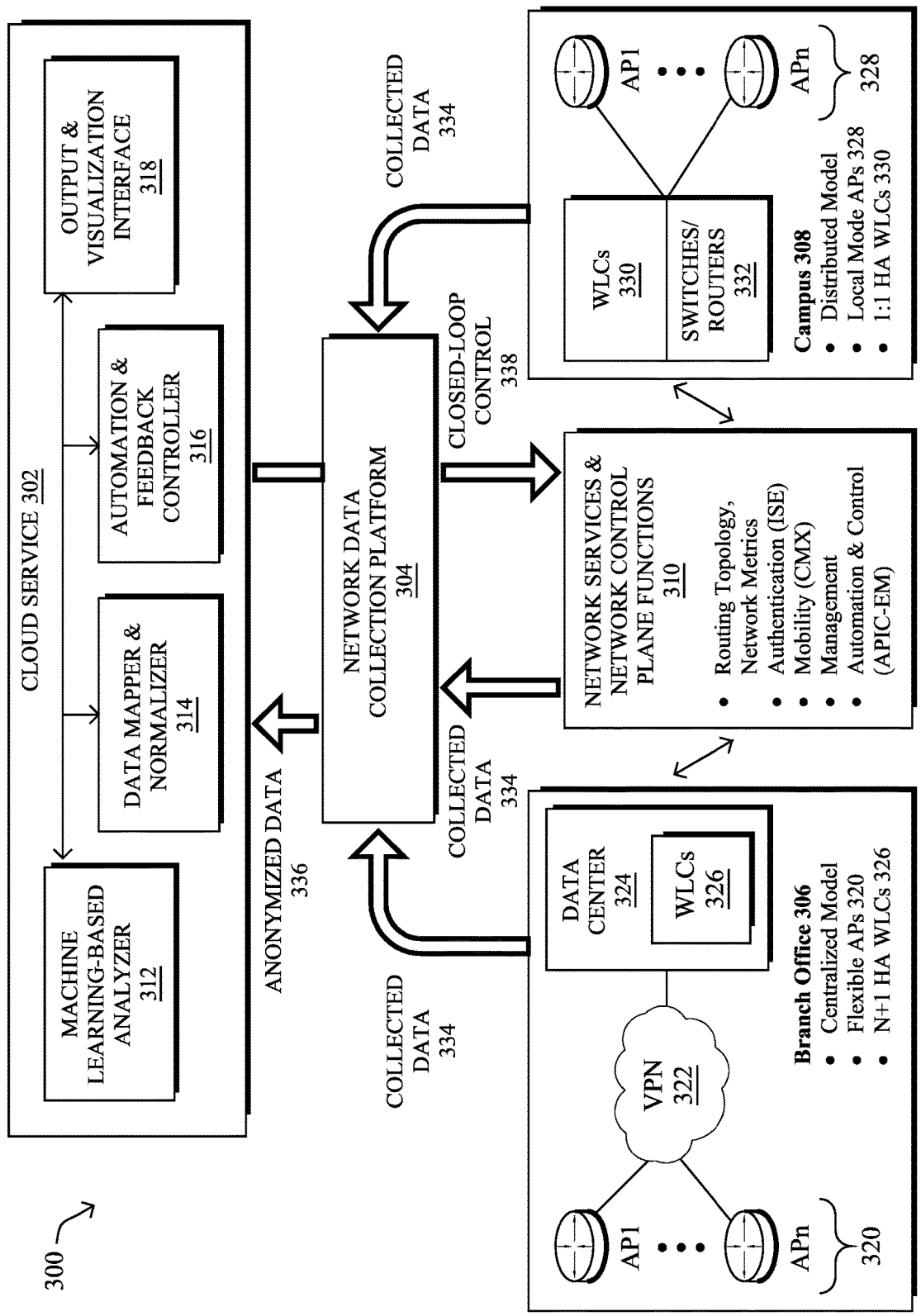
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a network assurance system/service can leverage machine learning-based anomaly detection to detect behavioral anomalies in a monitored network, such as a wireless network. Such a system may use outlier detection to flag anomalies by leveraging statistical techniques or thanks to the computation of predicted ranges using percentile regression, with the objective of detecting anomalies (rare events). In most cases, a second machine learning layer may also be used for identifying the root causes of anomalies using common trait analysis, cross signal correlation, and/or predefined rules, with closed loop control. However, finding root causes is challenging and that there is no one-size-fits-all approach and a collection of approaches are used in combination such as the ones listed above. Notably, one of the fundamental challenges of all machine learning-based anomaly detection is to provide the models with the proper measurements/key performance indicators (KPIs). If the proper KPI is not provided to the model as input, the root cause of a detected anomaly simply cannot be determined.

Dynamic Inspection of Networking Dependencies to Enhance Anomaly Detection Models in a Network Assurance Service The techniques herein introduce a mechanism that allows for the adjustment of the feature set of inputs to a machine learning model used to assess the operations of a network, based on the networking dependencies in the network. In some aspects, analysis of the network topology can be used to augment the model with additional features/measurements, to continuously improve the efficacy of the system and the ability of the system to identify the root causes of anomalies. In some implementations, data from an NMS or from the networking devices themselves can be correlated with the raised anomalies, to determine if one of these devices could be the root cause and should be added to the input feature set of the anomaly detection mechanism.

Specifically, according to one or more embodiments of the disclosure as described in detail below, a network assurance service that monitors a network detects, using a machine learning-based anomaly detector, network anomalies associated with source nodes in the monitored network. The network assurance service identifies, for each of the detected anomalies, a set of network paths between the source nodes associated with the anomaly and one or more potential destinations of traffic for that source node. The network assurance service correlates networking devices along the network paths in the identified sets of network paths with the detected network anomalies. The network assurance service adjusts the machine learning-based anomaly detector to use a performance measurement for a particular one of the networking devices as an input feature, based on the correlation between the particular networking device and the detected network anomalies.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
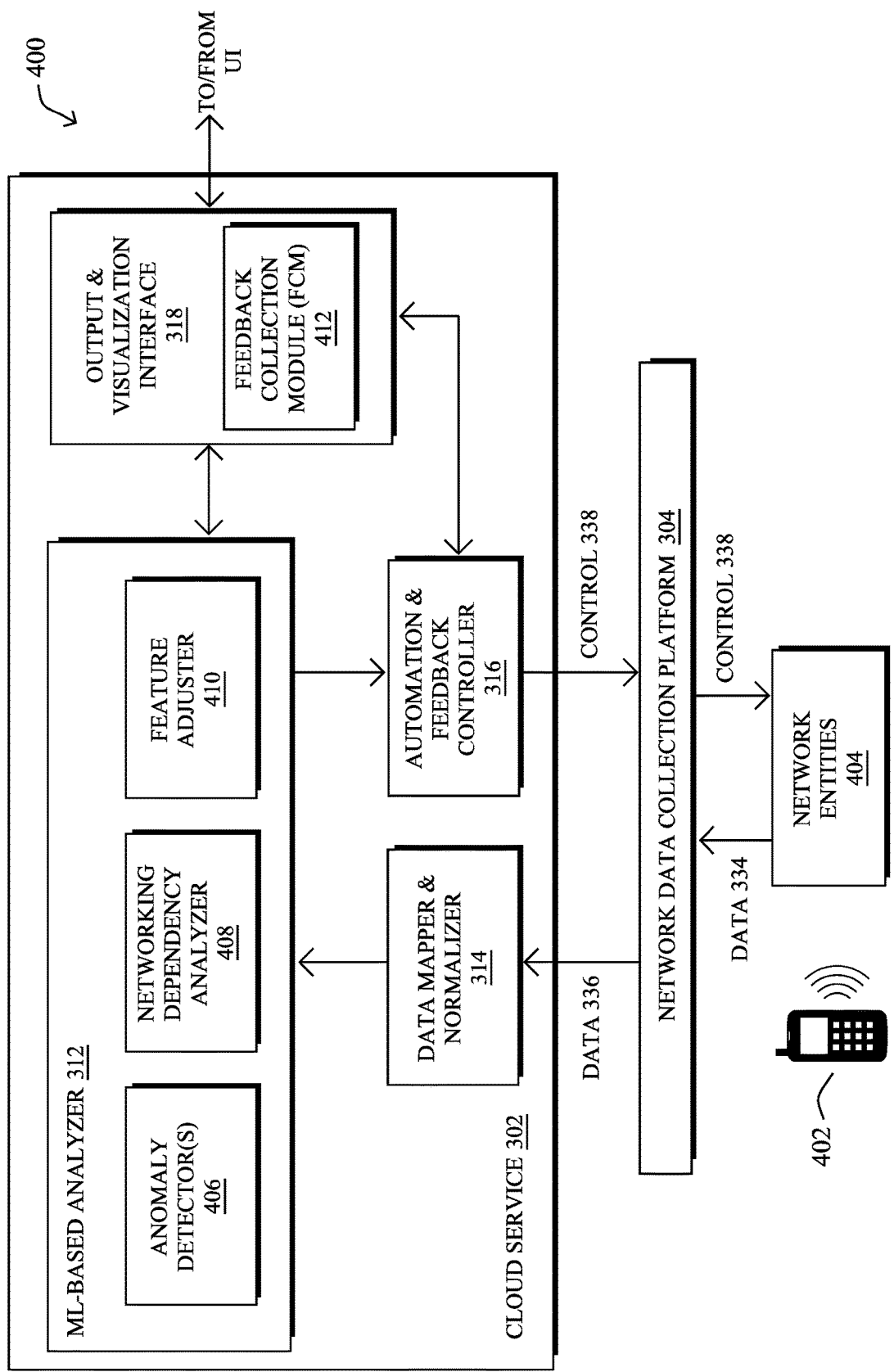
FIG. 4 illustrates an example architecture for a network assurance service.

Operationally, FIG. 4 illustrates an example architecture 400 for performing the dynamic inspection of networking dependencies to enhance anomaly detection models in a network assurance service, according to various embodiments. At the core of architecture 400 may be the following components: one or more anomaly detectors 406, a network dependency analyzer 408, a feature adjuster 410, and/or a feedback collection module (FCM) 412. In some implementations, the components 406-412 of architecture 400 may be implemented within a network assurance system, such as system 300 shown in FIG. 3. Accordingly, the components 406-412 of architecture 400 shown may be implemented as part of cloud service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components 406-412 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336 and/or data 334) and, in turn, assess the data using one or more anomaly detectors 406. At the core of each anomaly detector 406 may be a corresponding anomaly detection model, such as an unsupervised learning-based model. When an anomaly detector 406 detects a network anomaly, output and visualization interface 318 may send an anomaly detection alert to a user interface (UI) for review by a subject matter expert (SME), network administrator, or other user. Notably, an anomaly detector 406 may assess any number of different network behaviors captured by the telemetry data (e.g., number of wireless onboarding failures, onboarding times, DHCP failures, etc.) and, if the observed behavior differs from the modeled behavior by a threshold amount, the anomaly detector 406 may report the anomaly to the user interface via network anomaly, output and visualization interface 318.

According to various embodiments, architecture 400 may also include feedback collection module (FCM) 412, such as part of output and visualization interface 318 or other element of architecture 400. During operation, FCM 412 is responsible for collecting feedback on different alerts raised by service 302. In a simple embodiment, FCM 412 may include a combination of UI elements provided to the UI (e.g., a display, etc.), application programming interfaces (APIs), and/or databases that allow rankers to provide explicit feedback on the different alerts raised by service 302. These feedbacks are typically in the form of like/dislike cues and are explicitly associated to a given root cause. In another embodiment, FCM 412 may allow for feedback in the form of free-form text input from the UI and leverage Natural Language Understanding and Sentiment Analysis to assign similar scores to underlying root causes. Such an embodiment makes the process more natural to the user, but at the expense of a level of indirection that must be accounted for when exploiting these feedbacks.

In a further embodiment, FCM 412 may collect feedback generated by a third party application/system in charge of exploiting the root cause proposed by the system. For example, automation and feedback controller 316 or another mechanism may use root cause information for purposes of remediation (e.g., by controlling or adjusting the monitored network) and, based on its effects, provide feedback to FCM 412. For example, if the root cause of an on-boarding issue relates to a specific device causing the trouble (e.g., client 402), such a mechanism could blacklist the "bad apple." Thus, if the issue does not persist after the remediation action, the mechanism could provide an automatic feedback, thus validating the root raised by the system in the first place.

In some embodiments, anomaly detector(s) 406 may also be configured to perform root cause analysis on any detected anomalies. For example, one anomaly detection model may assess a certain feature set (e.g., measurements) from the network, while another model works in conjunction with the first model to attempt to explain why the first model detected an anomaly. By way of example, consider the case in which one model of an anomaly detector 406 uses features/measurements such as throughput, packet loss, etc., while another model of the anomaly detector attempts to determine the root cause of the behavioral anomalies by assessing the wireless channel in use, the number of attached clients to an AP, etc.

Rather than simply use a static feature set of measurements that an anomaly detector 406 may use for purposes of detecting behavioral anomalies in the network and/or the root cause of such an anomaly, the techniques herein introduce a mechanism to dynamically adjust the assessed features based on the networking dependencies involved. To this end, service 302 may be configured to report detected behavioral anomalies via an application program interface (API). For example, such a reported anomaly may include any or all of the following information:

Device ID (e.g., MAC address, IP address, etc.)
Device-type (e.g. Wireless controller, Wireless Access Point, Switch, etc.)
Severity of the anomaly (as specified by the AD system)
Time of the anomaly (with high accuracy using NTP)
Etc.

The same API can also be used by another Network Management System (NMS) and/or in the form of a Simple Network Management Protocol (SNMP) trap. In various embodiments, the reported anomalies can be used to obtain topology information from the network that may be associated with the detected anomalies.

In various embodiments, service 302 may include network dependency analyzer 408 that is configured to assess the networking dependencies of the networking devices (e.g., network entities 404) potentially involved in a behavioral anomaly detected in the monitored network. For each type of issue/anomaly, there may be one specific network path in the form of S-D tuples, where S is the ID of the networking device/entity identified in the above API and associated with the detected anomaly, whereas D is the potential destination of traffic associated with S.

By way of example, consider the case in which an anomaly detector 406 detects an anomaly in the onboarding times of wireless clients 402 to the monitored wireless network. In such a case, the behavioral anomalies may be associated with a particular AP (e.g., an entity 404 or even a client 402), the ID for which can be represented as S. In such a case, networking dependency analyzer 408 may work in conjunction with anomaly detector 406 to identify the potential networking dependencies associated with this anomaly. Notably, in the case of wireless clients onboarding onto a wireless network, the destination of the traffic may be a DHCP server or AAA server located at a different location from that of the onboarding client (e.g., onboarding of a client in local network 160 in FIG. 1B may entail leveraging a server located in data center/cloud 150). In such a case, D may represent the list of potential destinations involved in the onboarding. In another example related to throughput, D could be an exit gateway to the Internet, or a list of servers, if the Wireless SSID points to a server in the Intranet.

During operation, networking dependency analyzer 408 may perform any or all of the following:

For each S-D pair, resolve the address of all potential destinations. If D is a server type (e.g. DHCP, AAA, etc.), find all (DHCP/AAA/ . . . ) server addresses that might have been involved in the anomaly. Along with the server addresses there may be other information that logically separates the network paths—these also would be considered for the purpose of this invention. For example, the VLAN ID would hit a different DHCP pool resource within the same DHCP server. Hence, in this case VLAN ID would be another attribute used along with the DHCP IP address. This is particularly of interest in a fabric architecture.

Retrieving routing topologies: compute all paths $P_1, \ldots, P_n$ involved between S and D(s). In one embodiment, analyzer 408 may do so via a routing lookup. Indeed, analyzer 408 may interface with the routing domain (e.g., ISIS node with overload bit set) and it could compute a shortest path first (SPF) to find out all components listed in the paths. Note that in case of load balancing along the paths, alternate routers along those paths may have their Routing Information Base and/or Forwarding Information Base (RIB/FIB) inspected. In another embodiment, a second approach consisting in analyzer 408 causing Path Traces probes (traceroutes) to be sent, potentially also with the proper extensions to handle load balancing using MLPP and other approaches.

Construct a dependency graph (DG) where the root is the source S and leaves are all potential Ds, which include all potential paths. In turn, analyzer 408 may add each element/networking device $E=\langle E_1, \ldots, E_n\rangle$ of the set of Paths to a list $L_i$ for each anomaly i. Here, the Type of Service field or application type may also be considered for trace routes. In some anomalies where there are different applications and type of services involved (e.g., radio throughput may include multiple applications with different type of service), analyzer 408 may also consider the individual weighted path.

Correlate networking devices/elements with anomalies. In one embodiment, networking dependency analyzer 408 may, for all network elements listed in L, search for temporal correlations between the nodes in the dependency graphs and the anomalies detected by anomaly detector(s) 406. For example, in the case of on-boarding time anomalies, analyzer 408 might find that there is one common leaf between K dependency graphs (for K anomalies) that have failed at the same time. Let LC be the list of common elements found in multiple dependency trees for which analyzer 408 found time-correlation between failures. Note that the time correlation between failures of elements of LC may be triggered by automatic inspection of their respective logs. In this case, analyzer 408 may remotely connect to each of these elements, retrieving their respective logs and find time correlation between failures, before checking if the original anomaly took place at the same time. In another example, networking dependency analyzer 408 may find out that a given link in the network is shared between paths followed by the traffic generated by two wireless APs and one may find some correlation between the link failure (or high congestion state) and throughput anomalies experienced by the traffic originated by the two APs.

Figure 5:
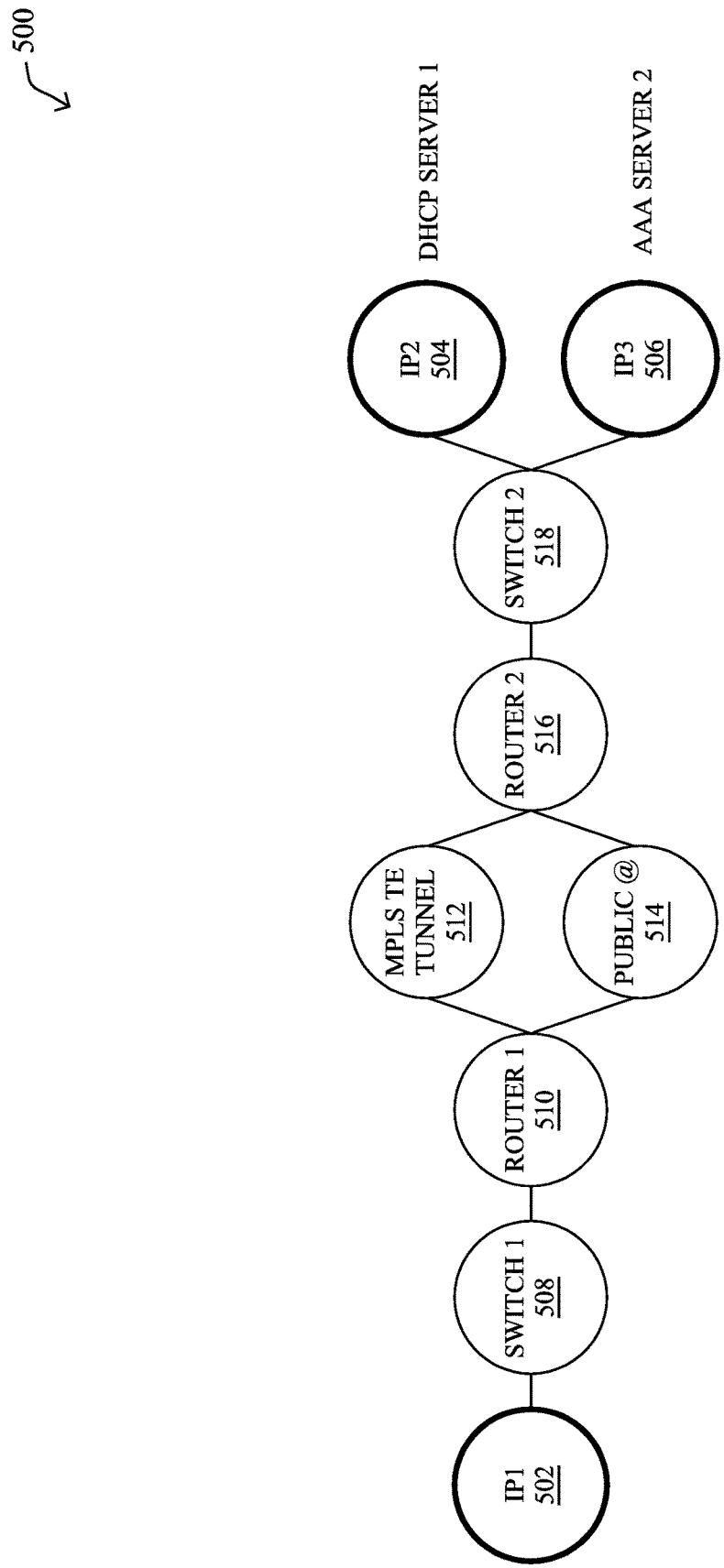
FIG. 5 illustrates an example dependency graph for a network.

FIG. 5 illustrates an example dependency graph 500 that networking dependency analyzer 408 may construct for a network behavioral anomaly detected by anomaly detector 406. In the case shown, assume that the anomaly is related to an onboarding anomaly (e.g., an anomalous onboarding time, etc.) associated with a source S, represented by root node 502 and its corresponding IP address, IP1. Since the anomaly is related to onboarding, there may be a set of potential destinations of traffic for S, which may be represented in graph 500 as nodes 504 and 506. Indeed, the set of destinations D may comprise the IP addresses of a first DHCP server and an AAA server that may be involved in the onboarding. Note that the actual destination may not be readily available from the detected onboarding anomaly, but may be identified by the anomaly type or known clients or devices associated with the anomaly (e.g., a particular AP, etc.).

Using the S-D pair, networking dependency analyzer 408 may obtain the network path information for the path(s) between S and the servers in D. In turn, analyzer 408 may represent the identified networking devices or other entities, such as tunnels or public networks, as their own nodes in graph 500. For example, as shown, graph 500 may also include node 508, a first switch and node 510, a first router, that are part of the local network of S. Also as shown, the router represented by node 510 may have dual connections to a second router, represented by node 516, via an MPLS TE tunnel (node 512) and via the public Internet (node 514). In turn, the second router, such as a router of a data center, may be connected to a second switch, represented by node 516, which provides connectivity to the two servers in D.

Figure 6:
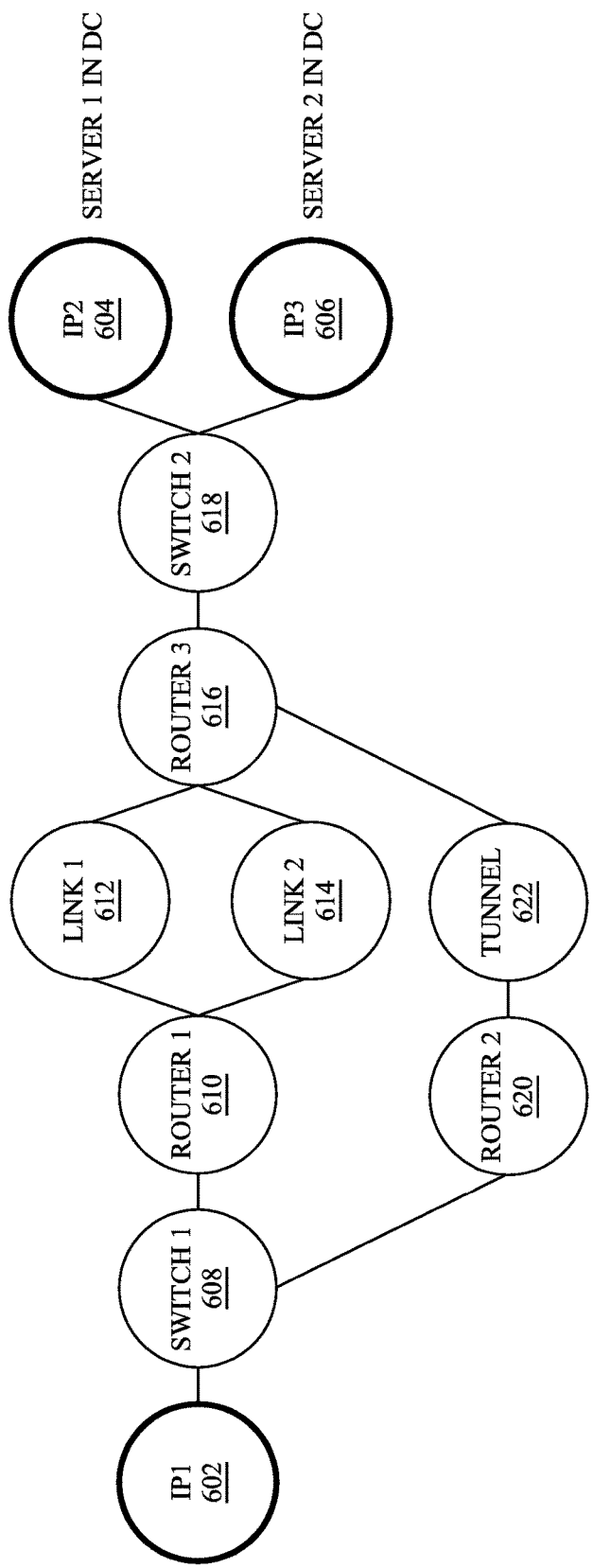
FIG. 6 illustrates another example dependency graph for a network.

FIG. 6 illustrates a second example of a dependency graph 600, in further embodiments. Similar to graph 500, graph 600 may include a source S, represented by node 602 and a list of potential destinations D, represented by nodes 604-606, which networking dependency analyzer 408 may identify from an anomaly detected by anomaly detector 406. In turn, analyzer 408 may obtain the path information, such as from an NMS, RIB/FIB information of the devices, using a traceroute, or the like. Using this topology information, analyzer 408 may represent the identified networking devices along the path(s) between S and D as nodes 608-618, to represent the various switches, routers, links, and tunnels that may separate S from its potential destination(s) in D.

Figure 7:
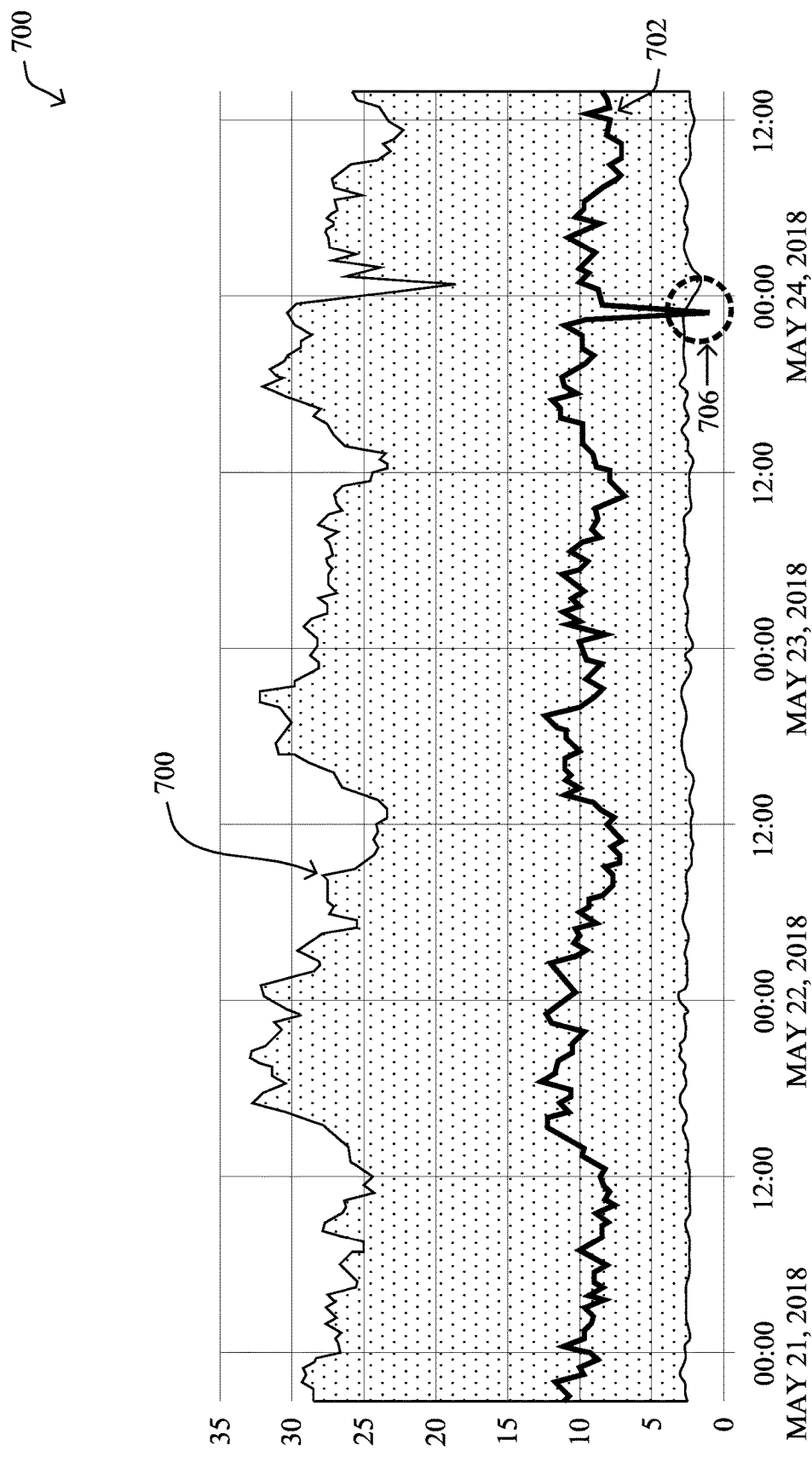
FIG. 7 illustrates an example plot of network throughput.

FIG. 7 illustrates an example plot 700 of network throughput for a network monitored during testing of the techniques herein. Plot 700 illustrates two values over time: 1.) the measured throughput 702 in the network and 2.) the prediction range 704 for the throughput by the anomaly detector 406. For the majority of the time, the measured throughput 702 falls within the prediction range 704 and, thus, anomaly detector 406 may deem the throughput to be normal. However, at point 706 shown, the throughput suddenly drops below the prediction range 704 and, consequently, flagged as an anomaly by anomaly detector 406. However, detection of the unexpected drop in throughput at point 706 does not actually explain why the throughput drops.

For purposes of illustration of the techniques herein, assume that the drop in throughput at point 706 was similarly experienced around this time at six other sites in the network. For each of these throughput anomalies, network dependency analyzer 408 may identify the network paths between the sources associated with the anomalies and their potential destinations, to construct dependency graphs. In turn, network dependency analyzer 408 may perform temporal correlation between the dependency graphs, to identify any common networking devices. For example, assume that each of the dependency graphs includes the same WLC, indicating a strong likelihood that this WLC is the root cause of the throughput anomalies.

Referring again to FIG. 4, another potential component of architecture 400 is feature adjuster 410, in some embodiments. During operation, feature adjuster 410 may identify the "missing" explanatory feature that should be used by the root causing model of anomaly detector(s) 406. Indeed, the subset of networking devices/elements for which a strong time-correlation has been found by networking dependency analyzer 408 can then be used by feature adjuster 410 to identify the missing KPI/input feature for the root cause model of anomaly detector 406. For example, in the case in which analyzer 408 determines that a particular WLC is highly correlated to throughput anomalies detected by an anomaly detector 406, feature adjuster 410 may add one or more measurements as input features to the root cause model of the detector 406, such as the CPU load of the WLC, memory usage of the WLC, or the like. By doing so, not only can service 302 identify when anomalous behavior occurs in the monitored network, but also provide an explanation as to why the anomaly occurred, as part of an alert sent by output and visualization interface 318. For example, such an alert may indicate that a throughput anomaly occurred and is likely due to a spike in the CPU usage by a particular WLC in the network.

Figure 8:
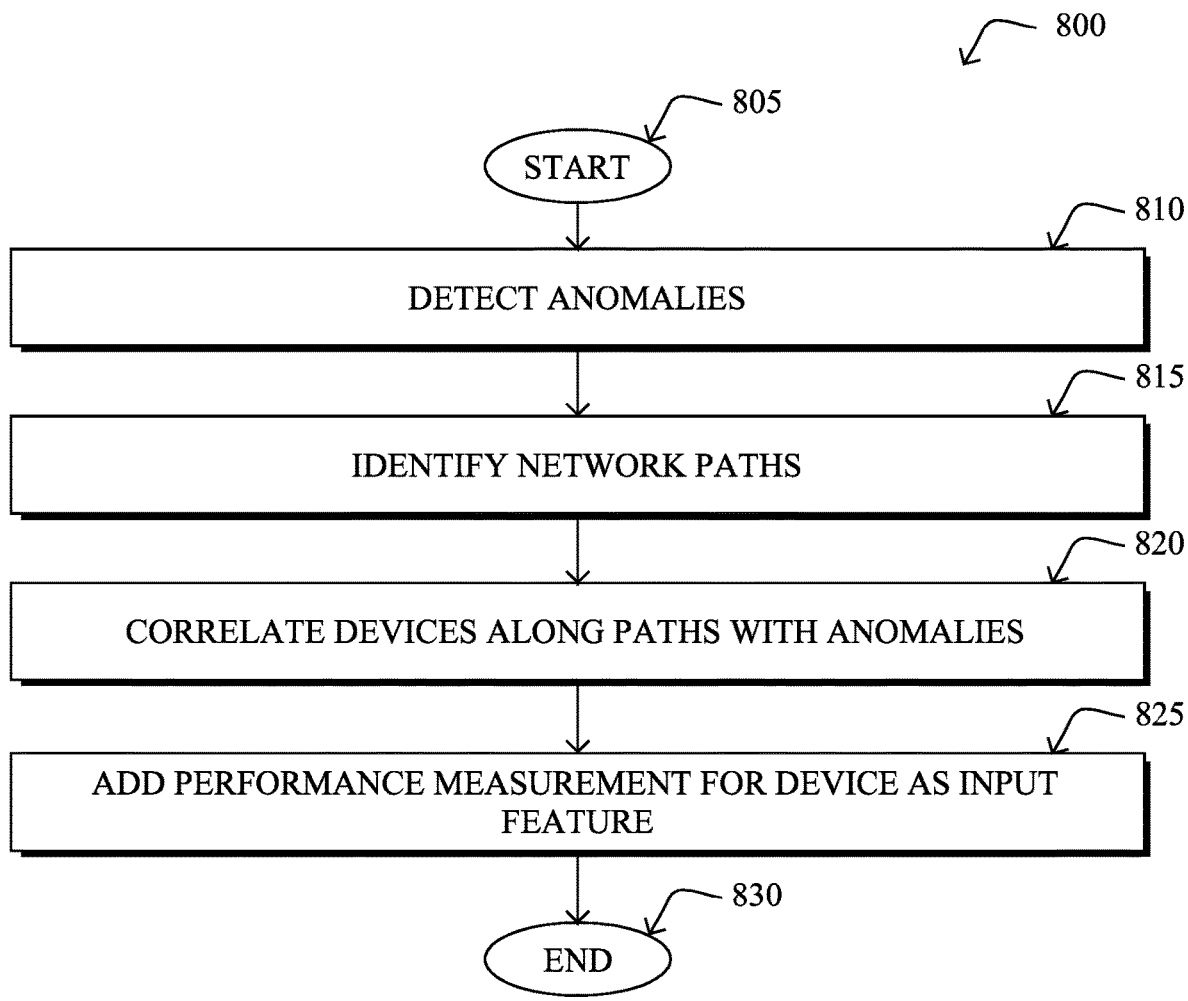
FIG. 8 illustrates an example simplified procedure for dynamic inspection of networking dependencies to enhance anomaly detection models.

FIG. 8 illustrates an example simplified procedure for dynamic inspection of networking dependencies to enhance anomaly detection models, in accordance with one or more embodiments described herein. For example, a non-generic, specifically configured device (e.g., device 200) may perform procedure 800 by executing stored instructions (e.g., process 248) to provide a network assurance service to a monitored network. The procedure 800 may start at step 805, and continues to step 810, where, as described in greater detail above, the service may detect, using a machine learning-based anomaly detector, network anomalies associated with source nodes in the monitored network. For example, the source nodes may be particular wireless APs, clients, or other devices in the network that are associated with the anomalies. The detected anomalies can also be of any number of different anomaly types. For example, the detector may be configured to detect throughput anomalies, onboarding anomalies, or the like, in the monitored network.

At step 815, as detailed above, the service may identify, for each of the detected anomalies, a set of network paths between the source nodes associated with the anomaly and one or more potential destinations of traffic for that source node. For example, in the case of onboarding anomalies, the potential destinations of the traffic could be DHCP or AAA servers. In some embodiments, the service may receive routing information base (RIB) or forwarding information base (FIB) information for the network paths. In further embodiments, the service may use traceroute information to form dependency graphs that connect the source nodes and the destinations.

At step 820, the service may correlate networking devices along the network paths in the identified sets of network paths with the detected network anomalies, as described in greater detail above. For example, in some cases, the service may correlate the detected anomalies with network device failure alarms from a network management system. In further embodiments, the service may represent the networking devices along the paths in dependency graphs and, in turn, perform temporal correlation to identify any networking devices that appear across the set of detected anomalies.

At step 825, as detailed above, the service may adjust the machine learning-based anomaly detector to use a performance measurement for a particular one of the networking devices as an input feature, based on the correlation between the particular networking device and the detected network anomalies. For example, if a particular AP, AP controller (e.g., WLC), switch, router, or the like, is highly correlated with the anomalies, the service may add one or more performance measurements for that device to the root cause model of the anomaly detector. By doing so, the detector can not only identify behavioral anomalies in the network, but the detector can also potentially identify the cause of the anomaly. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the use of networking dependencies among networking devices in a monitored network to be leveraged for purposes of explaining behavioral anomalies in the network.

While there have been shown and described illustrative embodiments that provide for the dynamic inspection of networking dependencies to enhance anomaly detection models in a network assurance service, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    detecting, by a network assurance service that monitors a network, anomalies in the network using a machine learning-based anomaly detector;
    identifying, by the network assurance service and for each of the detected anomalies, a set of network paths between a source node associated with a respective one of the detected anomalies and one or more potential destinations of traffic for the source node;
    correlating, by the network assurance service, the detected anomalies with one or more networking devices located along any of the network paths in the set of network paths;
    selecting, by the network assurance service, a particular networking device among the one or more networking devices correlated with the detected anomalies; and
    adjusting, by the network assurance service, an input feature set of the machine learning-based anomaly detector, such that the input feature set of the machine learning-based anomaly detector further comprises a performance measurement of the particular network device,
    wherein the identifying, for each of the detected anomalies, the set of network paths comprises:
    constructing a dependency graph for each of the detected anomalies, each dependency graph defining one or more network paths that connect the source node associated with a respective one of the detected anomalies to the one or more potential destinations of traffic for the source node,
    wherein the set of network paths comprises the respective one or more network paths defined by each dependency graph.

2. The method as in claim 1, wherein the destinations comprise an authentication, authorization and accounting (AAA) server or a Dynamic Host Configuration Protocol (DHCP) server.

3. The method as in claim 1, wherein the particular networking device comprises a controller for one or more wireless access points in the monitored network.

4. The method as in claim 1, wherein the identifying, by the network assurance service and for each of the detected anomalies, the set of network paths comprises:
    receiving routing information base (RIB) or forwarding information base (FIB) information for the network paths.

5. The method as in claim 1, wherein the correlating the detected anomalies with the one or more networking devices located along any of the network paths comprises:
    correlating the detected anomalies with network device failure alarms from a network management system.

6. The method as in claim 1, wherein the one or more networking devices along the network paths are represented in each dependency graph as nodes.

7. The method as in claim 6, wherein the correlating the detected anomalies with the one or more networking devices located along any of the network paths comprises:
    temporally correlating each dependency graph to the detected anomalies; and
    identifying the particular networking device as a potential cause of at least a portion of the detected anomalies, based on the particular networking device appearing in one or more of each dependency graph that is temporally correlated to the detected anomalies.

8. An apparatus, comprising:
    one or more network interfaces to communicate with a network;
    a processor coupled to the network interfaces and configured to execute one or more processes; and
    a memory configured to store a process executable by the processor, the process when executed causing the processor to:
        detect anomalies in the network using a machine learning-based anomaly detector;
        identify, for each of the detected anomalies, a set of network paths between a source node associated with a respective one of the detected anomalies and one or more potential destinations of traffic for the source node;
        correlate the detected anomalies with one or more networking devices located along any of the network paths in the set of network paths;
        select a particular networking device among the one or more networking devices correlated with the detected anomalies; and
        adjust an input feature set of the machine learning-based anomaly detector, such that the input feature set of the machine learning-based anomaly detector further comprises a performance measurement of the particular network device,
    wherein the apparatus identifies, for each of the detected anomalies, the set of network paths by:
    constructing a dependency graph for each of the detected anomalies, each dependency graph defining one or more network paths that connect the source node associated with a respective one of the detected anomalies to the one or more potential destinations of traffic for the source node,
    wherein the set of network paths comprises the respective one or more network paths defined by each dependency graph.

9. The apparatus as in claim 8, wherein the destinations comprise an authentication, authorization and accounting (AAA) server or a Dynamic Host Configuration Protocol (DHCP) server.

10. The apparatus as in claim 9, wherein the apparatus correlates the detected anomalies with the one or more networking devices located along any of the network paths by:
    correlating the detected anomalies with network device failure alarms from a network management system.

11. The apparatus as in claim 8, wherein the particular networking device comprises a controller for one or more wireless access points in the monitored network.

12. The apparatus as in claim 8, wherein the one or more networking devices along the network paths are represented in each dependency graph as nodes.

13. The apparatus as in claim 12, wherein the apparatus correlates the detected anomalies with the one or more networking devices located along any of the network paths by:
   temporally correlating each dependency graph to the detected anomalies; and
   identifying the particular networking device as a potential cause of at least a portion of the detected anomalies, based on the particular networking device appearing in one or more of each dependency graph that is temporally correlated to the detected anomalies.

14. The apparatus as in claim 8, wherein the apparatus identifies, for each of the detected anomalies, the set of network paths by:
   receiving routing information base (RIB) or forwarding information base (FIB) information for the network paths.

15. A tangible, non-transitory, computer-readable medium storing program instructions that cause a network assurance service to execute a process comprising:
   detecting, by the network assurance service, anomalies in the network using a machine learning-based anomaly detector;
   identifying, by the network assurance service and for each of the detected anomalies, a set of network paths between a source node associated with a respective one of the detected anomalies and one or more potential destinations of traffic for the source node;
   correlating, by the network assurance service, the detected anomalies with one or more networking devices located along any of the network paths in the set of network paths;
   selecting, by the network assurance service, a particular networking device among the one or more networking devices correlated with the detected anomalies; and
   adjusting, by the network assurance service, an input feature set of the machine learning-based anomaly detector, such that the input feature set of the machine learning-based anomaly detector further comprises a performance measurement of the particular network device,
   wherein the identifying, for each of the detected anomalies, the set of network paths comprises:
   constructing a dependency graph for each of the detected anomalies, each dependency graph defining one or more network paths that connect the source node associated with a respective one of the detected anomalies to the one or more potential destinations of traffic for the source node,
   wherein the set of network paths comprises the respective one or more network paths defined by each dependency graph.

16. The computer-readable medium as in claim 15, wherein the destinations comprise an authentication, authorization and accounting (AAA) server or a Dynamic Host Configuration Protocol (DHCP) server.

17. The computer-readable medium as in claim 15, wherein the particular networking device comprises a controller for one or more wireless access points in the monitored network.

18. The computer-readable medium as in claim 15, wherein the one or more networking devices along the network paths are represented in each dependency graph as nodes.

19. The computer-readable medium as in claim 18, wherein the correlating the detected anomalies with the one or more networking devices located along any of the network paths comprises:
   temporally correlating each dependency graph to the detected anomalies; and
   identifying the particular networking device as a potential cause of at least a portion of the detected anomalies, based on the particular networking device appearing in one or more of each dependency graph that is temporally correlated to the detected anomalies.

\* \* \* \* \*